(12) United States Patent
Kim et al.

(10) Patent No.: US 8,934,188 B1
(45) Date of Patent: *Jan. 13, 2015

(54) ADAPTIVE WRITE POLE TIP PROTRUSION COMPENSATION

(71) Applicant: Seagate Technology LLC, Cupertino, CA (US)

(72) Inventors: Shi Jung Kim, Sai Wan Ho (HK); Won Choul Yang, Kowloon Tong (HK); Ju Yong Lee, Kowloon (HK)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,863

(22) Filed: Sep. 25, 2013

(51) Int. Cl.
G11B 5/02 (2006.01)
G11B 27/36 (2006.01)

(52) U.S. Cl.
CPC .................................... G11B 27/36 (2013.01)
USPC .......................................................... 360/55

(58) Field of Classification Search
None
See application file for complete search history.

(56) References Cited

U.S. PATENT DOCUMENTS

| 7,095,576 | B2 | 8/2006 | Kim et al. | |
| 7,355,804 | B1* | 4/2008 | Kassab et al. | 360/46 |
| 7,480,115 | B2* | 1/2009 | Hiroyuki et al. | 360/75 |
| 7,483,227 | B1* | 1/2009 | Chen et al. | 360/25 |
| 7,583,467 | B2 | 9/2009 | Lee | |
| 7,855,849 | B2 | 12/2010 | Dina et al. | |
| 7,864,475 | B2* | 1/2011 | Nakamura | 360/59 |
| 8,705,190 | B2* | 4/2014 | Shibasaki | 360/31 |
| 2002/0122268 | A1* | 9/2002 | Bement et al. | 360/75 |
| 2004/0075931 | A1* | 4/2004 | Kim et al. | 360/66 |
| 2005/0018347 | A1* | 1/2005 | Hsiao et al. | 360/128 |
| 2005/0057841 | A1* | 3/2005 | Stover et al. | 360/59 |
| 2006/0072229 | A1* | 4/2006 | Yun et al. | 360/31 |
| 2007/0268612 | A1* | 11/2007 | Fitzpatrick et al. | 360/75 |
| 2007/0268614 | A1* | 11/2007 | Henry et al. | 360/75 |
| 2007/0268615 | A1* | 11/2007 | McFadyen et al. | 360/75 |
| 2008/0024896 | A1* | 1/2008 | Ohta et al. | 360/59 |
| 2008/0068749 | A1* | 3/2008 | Kurihara et al. | 360/110 |
| 2009/0268335 | A1* | 10/2009 | Huang et al. | 360/75 |
| 2011/0013308 | A1* | 1/2011 | Brand | 360/59 |
| 2011/0235207 | A1* | 9/2011 | Yang | 360/75 |
| 2012/0002319 | A1* | 1/2012 | Kondo | 360/59 |
| 2013/0170070 | A1* | 7/2013 | Das et al. | 360/75 |

OTHER PUBLICATIONS

Boettcher et al., "Dynamic Flying Height Adjustment in Hard Disk Drives Through Feedforward Control," IEEE Transaction on Magnetics, vol. 47, No. 7, Jul. 2011.

Ong et al., "Dynamic Writer Pole-Tip Protrusion Compensation by Thermal Actuator," IEEE Transaction on Magnetics, vol. 48, No. 11, Nov. 2012.

* cited by examiner

*Primary Examiner* — Peter Vincent Agustin
(74) *Attorney, Agent, or Firm* — Taylor English Duma LLP

(57) ABSTRACT

Technologies are described herein for adaptive write pole tip protrusion compensation in a storage device having magnetic recording media. Variations in temperature of a head of a storage device are measured for various combinations of values of write-channel parameters during multiple test writes to the recording media. Sensitivity of the head temperature to change in value of the write-channel parameters is determined from the temperature measurements. A ratio of change in write pole tip protrusion of the head to change in head temperature is also determined. From the sensitivity of the head temperature to change in value of the write-channel parameters and the ratio of change in write pole tip protrusion of the head to change in head temperature, a coefficient corresponding to each write-channel parameter is calculated for the head to be utilized in a write pole tip protrusion compensation mechanism of the storage device.

20 Claims, 4 Drawing Sheets

ADAPTIVE WRITE POLE TIP PROTRUSION COMPENSATION

BRIEF SUMMARY

The present disclosure relates to technologies for adaptive write pole tip protrusion compensation ("WPTPC") in a storage device having magnetic recording media, such as a hard-disk drive ("HDD") device. According to some embodiments, a method comprises measuring variation in temperature of a head of a storage device across multiple writes (in some embodiments, test writes) of the head utilizing different combinations of values of write-channel parameters. A sensitivity of the head temperature to change in value is determined for each of the write-channel parameters from the temperature measurements. A ratio of change in write pole tip protrusion of the head to change in head temperature is also determined. From the sensitivity of the head temperature to change in value of the write-channel parameters and the ratio of change in write pole tip protrusion of the head to change in head temperature, a coefficient corresponding to each write-channel parameter is calculated for the head to be utilized in a write pole tip protrusion compensation mechanism of the storage device.

According to further embodiments, a computer-readable storage medium comprises processor-executable instructions that, when executed by a processor, cause the processor to perform a plurality of test writes of a head of a storage device, each of the plurality of test writes having a different value for a write-channel parameter. The resistance of a head disk interface ("HDI") sensor of the head is measured for each of the plurality of test writes, and a sensitivity of the resistance of the HDI sensor to change in value of the write-channel parameter is determined from the resistance measurements. A ratio of change in write pole tip protrusion of the head to change in resistance of the HDI sensor is determined, and a coefficient corresponding to the write-channel parameter based is calculated based on the sensitivity of the resistance of the HDI sensor to change in value of the write-channel parameter and the ratio of change in write pole tip protrusion of the head to change in resistance of the HDI sensor.

According to further embodiments, a system comprises a storage device having a read/write head, a processor, and a WPTPC coefficient calculation module. The WPTPC coefficient calculation module is configured to cause the processor to perform a plurality of test writes of the read/write head, each of the plurality of test writes having a different combination of values for a plurality of write-channel parameters. Variations in the head temperature of the read/write head is measured for each of the plurality of test writes, and a sensitivity of the head temperature to change in value of each of the plurality of write-channel parameters is determined. A ratio of change in write pole tip protrusion of the read/write head to change in head temperature is determined, and a WPTPC coefficient corresponding to each of the plurality of write-channel parameters is calculated based on the sensitivity of the head temperature to change in the value of the write-channel parameter and the ratio of change in write pole tip protrusion of the head to change in head temperature. The WPTPC coefficients are stored in a memory of the storage device.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
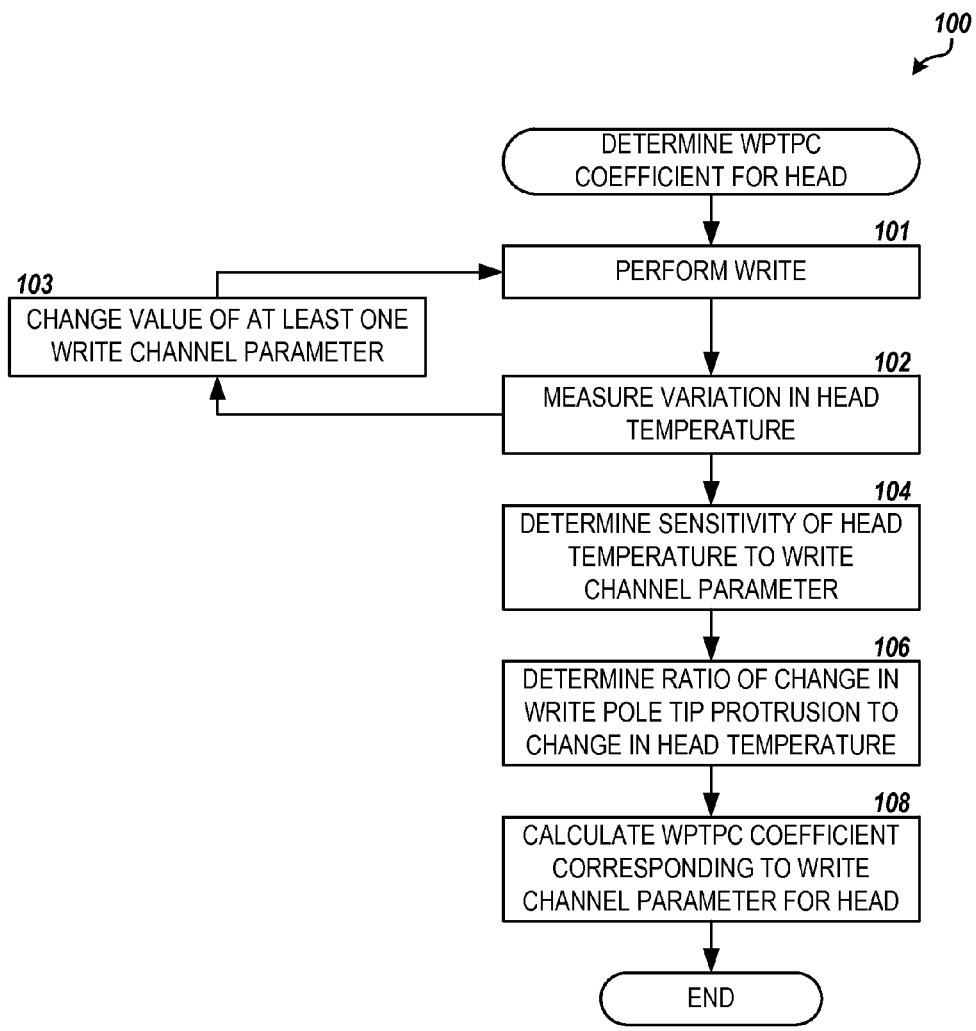
FIG. 1 is a flow diagram showing one routine for determining a write pole tip protrusion compensation coefficient corresponding to a write-channel parameter for a head of a storage device, according to embodiments described herein.

The following detailed description is directed to technologies for adaptive write pole tip protrusion compensation in a storage device having magnetic recording media. A typical storage device may include a hard-disk drive ("HDD") device having one or more rotatable disks with magnetic recording surfaces. Increased storage capacity of storage devices may be realized by increasing the storage density of the magnetic media. An increase in storage density may result in increased data rates for reading and writing data to the media. At very high data rates, maintaining proper spacing between a read/write head and the recording surface of the magnetic media, or "flying height" of the head, becomes critical to the performance of the read/write head. The flying height of the read/write head of a typical storage device may be on the order of several nanometers. Further, the flying height of the head must be controlled in order to prevent contact between the read/write head and the recording surface of the media, also referred to herein as "touchdown" of the head, which may result in read or write failures, data loss, or unrecoverable damage to the recording surface.

The flying height of the read/write head may be controlled mechanically at a static height by a slider positioned at the end of a gimbal/arm assembly that "flies" over the recording surface of the media. The flying height of the read/write head may further be adjusted by a head heater, such as a fly-on-demand ("FOD") heater, that raises the temperature of the head, causing the surface of the head and the associated reading and writing elements to protrude towards the recording surface of the media. The protrusion of the surface of the head decreases the spacing between the reading and writing elements and the media. In order to achieve an optimal flying height of the read/write head for a particular read or write operation, a controller of the storage device may supply a specific amount of power to the head heater, thus controlling the amount of protrusion of the surface of the head and the associated reading and writing elements.

The amount of protrusion of the surface of the read/write head may depend on the temperature of the head. For a read operation, the temperature of the head may controlled primarily by the head heater. For a write operation, however, the signal applied to the writing element of the read/write head may also contribute to the temperature of the head, and thus the amount of protrusion of the surface of the head and the associated writing element. The protrusion of the writing element is referred to herein as write pole tip protrusion ("WPTP"). The signal applied to the writing element may depend on a number of write-channel parameter values used in the write operation. For example, in order to optimize the write channel for writing to a general location on the recording surface of the media, referred to herein as the target zone, the controller of the storage device may adjust write-channel parameters, such as the write current ("I"), a write overshoot amplitude ("A") and a write overshoot duration ("D"), for the target zone.

When processing a write operation to a target zone, the controller of the storage device may compensate for additional WPTP induced by the write signal based on the values of the write-channel parameters by adjusting the amount of power applied to the head heater accordingly in order to achieve optimal flying height of the read/write head and prevent touchdowns. The controller may apply a WPTP compensation equation with predetermined coefficients for the read/write head in order to determine the adjustment to the head heater power. For example, the controller may utilize a first order equation such as:

$$dFODW = a \times dI + b \times dA + c \times dD + d$$

where dFODW represents the change in power to the head heater from a base level; dI, dA and dD represents a difference from base values of the various write-channel parameters I, A and D, as discussed above; and a, b, c and d are pre-determined coefficients for the read/write head of the storage device. It will be appreciated that other WPTP compensation equations with different numbers of coefficients may be utilized by the controller of the storage device, such as the second order equation:

$$dFODW = a \times dI + b \times dA + c \times dD + d + e \times dI^2 + f \times dA^2 + g \times dD^2 + h \times dIA + i \times dAD + j \times dDA$$

The coefficients for the WPTP compensation equation may be predetermined by performing write mode contact detection testing of storage devices containing the same or similar read/write heads for various combinations of write-channel parameter values to determine the power level of the head heater that causes a touchdown of the head. For example, write mode contact detection testing may be performed for N combinations of the write-channel parameter values I, A and D and the results recorded as:

$$M = \begin{bmatrix} I_1 & A_1 & D_1 & 1 \\ I_2 & A_2 & D_2 & 1 \\ \cdots & \cdots & \cdots & \cdots \\ I_N & A_N & D_N & 1 \end{bmatrix}, \quad \text{result} = \begin{bmatrix} WTD_1 \\ WTD_2 \\ \cdots \\ WTD_N \end{bmatrix}$$

where M is a matrix containing the N combinations of write-channel parameter values and result is a matrix containing the power level of the head heater ("WTD") at which touchdown of the read/write head was detected.

The write mode contact detection testing may be performed for a group of read/write heads in similar storage devices and/or across several different target zones of the recording media, and the result matrix averaged across the tested read/write heads and/or target zones. The coefficients for the read/write head may then be calculated from the averaged results. For example, for the first order WPTP compensation equation provided above, the coefficients a, b, c and d may be computed using linear regression analysis with the "least squares" approach:

$$\begin{bmatrix} a \\ b \\ c \\ d \end{bmatrix} = (M^T \times M)^{-1} \times M^T \times \text{result}$$

where $M^T$ represents the transposition of the matrix M. It will be appreciated that the value of d in this example will be zero.

However, utilizing the write mode contact detection procedure described above to generate the coefficients for the WPTP compensation equation requires testing of a number of similar read/write heads across a number of storage devices to generate the average results. Therefore the pre-determined coefficients cannot account for a specific thermal response of a particular read/write head or other characteristics of a particular storage device. Further, this procedure subjects the storage device to a large number of touchdown events during testing. This may result in a significant portion of the recording surface of the media left unusable for storage during normal operation of the storage device, also referred to herein as the "user mode." For example, testing for combinations of five values each of the write-channel parameter values I, A and D results in N=125 touchdown events during write mode contact detection testing for each zone.

According to embodiments presented herein, methods and processes for determining coefficients for the WPTP compensation equation may be implemented that are based on sensitivity of the temperature of the read/write head to changes in values of the write-channel parameters and a correlation between change in the amount of WPTP of the read/write head and change in the temperature of the head. In some embodiments, the variation in the temperature of the head may be determined by measuring changes in the DC resistance of a head-to-disk interface ("HDI") sensor of the head. Utilizing the methods and processes described herein, the coefficients for the WPTP compensation equation, also referred to herein as "WPTPC coefficients," may be determined for an individual read/write head of a storage device during a "burn-in" or certification ("CERT") processing of that storage device, thus making the WPTP compensation equation adaptive to the thermal response and other characteristics of the specific head and/or storage device. In addition, determination of the WPTPC coefficients utilizing the methods and routines described herein may require substantially fewer touchdown events than the write mode contact detection testing procedure described above, thus preventing unnecessary damage to the recording surface of the storage medium. In some embodiments, the determination of the WPTPC coefficients may only require two touchdown events, for example.

FIG. 1 provides a high-level overview of a method for adaptive write pole tip protrusion compensation in a storage device, according to some embodiments. Specifically, FIG. 1 illustrates one routine 100 for determining a WPTPC coefficient corresponding to a write-channel parameter for a particular read/write head of the storage device. The routine 100 may be performed during the CERT process of the storage device, for example. According to some embodiments, the routine 100 may be performed by a controller of the storage device. In other embodiments, the routine 100 may be performed by a computing system external to and operably connected to the storage device.

The routine 100 begins at step 101, where a test write or other type of write is performed utilizing the read/write head. Next, at step 102, a variation in temperature of the read/write head is measured during the write. According to some embodiments, the variation in temperature may be measured by measuring the variation in the DC resistance of an HDI sensor of the head. From step 102, the routine 100 proceeds to step 103, where the value of at least one write-channel parameter is changed and the routine then returns to step 101 where another write is performed. After a series of writes has been performed over a number of different values of the write-channel parameter, the routine 100 proceeds to step 104, where a sensitivity of the temperature of the read/write head to changes in value of the write-channel parameter is determined from the measurements made in step 102. As described below in regard to FIG. 4, linear regression analysis may be utilized to determine the sensitivity of the temperature of the head to changes in the value of the write-channel parameter.

The routine 100 proceeds from step 104 to step 106, where a ratio of WPTP of the read/write head to change in head temperature is determined. According to some embodiments, this ratio may be determined by performing write mode contact detection testing of the head for a limited number of write-channel parameter value combinations resulting in high and low temperature measurements of the head. From step 106, the routine 100 proceeds to step 108, where a WPTPC coefficient corresponding to the write-channel parameter is calculated for the read/write head based on the sensitivity of the head temperature to changes in value of the write-channel parameter and the ratio of WPTP of the read/write head to change in head temperature, as is described in more detail below in regard to FIG. 4. The calculated coefficient may then be stored for the head in the controller of the storage device for use in WPTP compensation calculations performed by the controller during write operations to the head in the user mode of the device. From step 108, the routine 100 ends.

Figure 2:
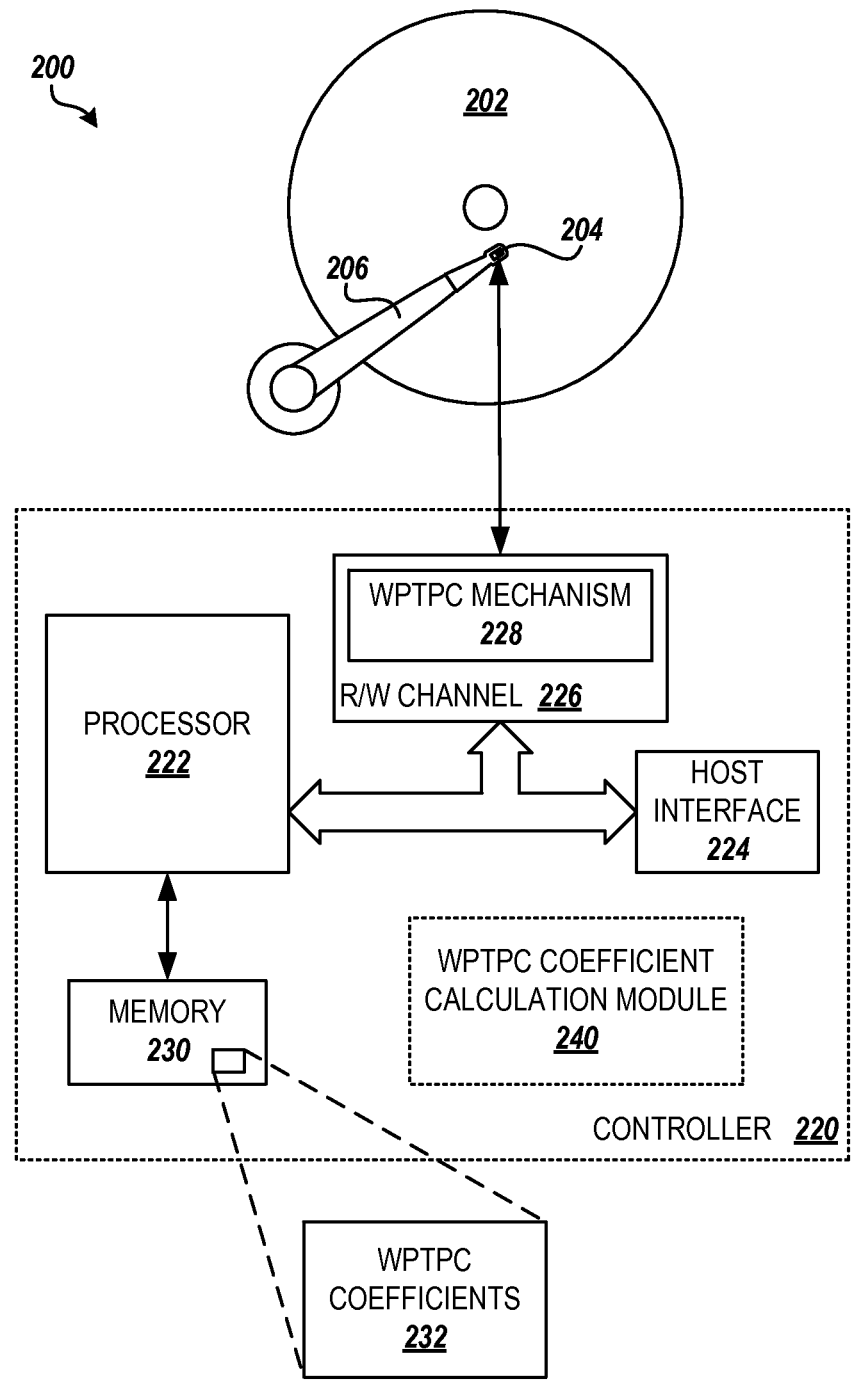
FIG. 2 is a block diagram showing an illustrative environment for adaptive write pole tip protrusion compensation in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with several hardware, software and components for implementing adaptive write pole tip protrusion compensation in the storage device. The storage device 200 may include magnetic media comprising at least one platter or disk 202 having a magnetic surface or coating.

The storage device 200 further includes at least one read/write head 204 located adjacent to the surface of each disk 202. The read/write head 204 may read information from the disk 202 by sensing a magnetic field formed on portions of the surface of the disk, and may write information to the disk by magnetizing a portion of the surface of the disk. The read/write head 204 may be attached to the end of an arm 206, the arm being further connected to an actuator that may be rotated to reposition the read/write head 204.

Figure 3:
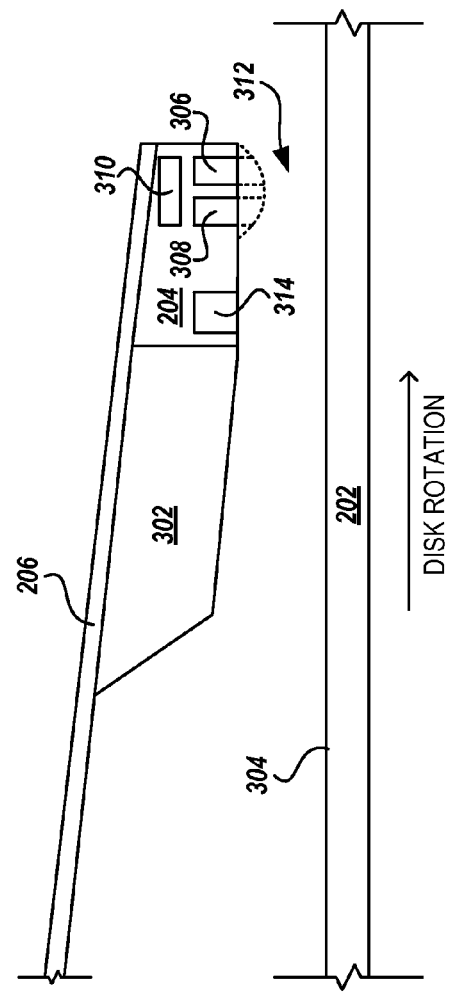
FIG. 3 is a block diagram showing further details of a head of the illustrative storage device, according to embodiments described herein.

Referring to FIG. 3, the read/write head 204 may be positioned at the trailing edge of a slider 302 attached to the distal end of the arm 206. The slider 302 may be configured to "fly" over the recording surface 304 of the disk 202 to produce a substantially static flying-height of the read/write head 204. The read/write head 204 further includes a writer element 306 and a reader element 308. According to embodiments, the writer element comprises an inductive writer head. The reader element 308 may comprise a magneto-resistive ("MR") reader, tunneling MR reader, or the like. The read/write head 204 further includes at least one head heater 310. The head heater 310 may comprise a flying-on-demand ("FOD") heater. The FOD heater controls the flying height of the read/write head 204 by increasing the temperature of the head to produce a protrusion at a lower surface, thus decreasing the gap between the writer pole tip and/or reader pole tip and the recording surface 304 of the disk 202, as shown at 312 in FIG. 3. While a single head heater 310 is shown, it will be appreciated that the read/write head 204 may include two or more heating elements, each configured to produce a protrusion at the pole tip of the writer element 306 or reader element 308 independently, thus allowing more complex profile control of the lower surface of the read/write head.

In some embodiments, the read/write head 204 may also include a head disk interface ("HDI") sensor 314. The HDI sensor 314 may be a resistive temperature sensor that detects temperature change in the read/write head 204 induced by clearance changes over the recording surface 304 and/or contact of the head with the disk 202. The HDI sensor 314 may be utilized to 200 to determine the current flying height of the read/write head 204, to measure warpage of the over the recording surface 304 of the disk 202, to detect touchdown of the head, and the like. It will be appreciated by one of ordinary skill in the art that the read/write head 204 may comprise multiple additional components, such as additional reader or writer elements, temperature or other sensors, and the like. It will be further appreciated that the size, location and relative orientation of the writer element 306, the reader element 308, the head heater 310, the HDI sensor 314 and the other elements shown in FIG. 3 are for illustrative purposes only, and one of ordinary skill in the art will recognize that other sizes, locations and relative orientations are possible and part of this disclosure.

Returning to FIG. 2, the storage device 200 may further comprise a controller 220 that controls the operations of the storage device. The controller 220 may include a processor 222 to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transferring the formatted data via a read/write channel 226 through the read/write head 204 and to the recording surface 304 of the disk 202. The processor 222 may further process read commands from the host device by determining the location of the desired data on the recording surface 304 of the disk 202, moving the read/write head(s) 204 to the location (track) of the data, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned at specific locations over the recording surface 304 of the disk 202 for reading and writing data by moving the read/write head 204 radially across different tracks of the disk 202 using the actuator while the disk rotates.

According to embodiments, the read/write channel 226 may implement a write pole tip protrusion compensation mechanism 228. The write pole tip protrusion compensation mechanism 228 may utilize a WPTP compensation equation such as that described above to adjust the amount of power applied to the head heater 310 based on the current values of write-channel parameters in order to achieve optimal flying height of the read/write head and prevent touchdowns. The write pole tip protrusion compensation mechanism 228 may be implemented as software, hardware or any combination of the two in the read/write channel 226 and/or controller 220. The write pole tip protrusion compensation mechanism 228, in some embodiments, may use other designs besides the head heater 310 to compensate for WPTP, such as a cooling structure, modifying aerodynamic variables or other methods.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 230 may further comprise a portion of the storage media of the storage device 200, such as the maintenance cylinder ("M/C") of the disk 202. For example, the memory 230 may store a firmware that comprises commands and data necessary for performing the operations of the storage device 200. According to some embodiments, the memory 230 may store processor-executable instructions that, when executed by the processor, perform the routines 100 and 400 for performing adaptive write pole tip protrusion compensation in the storage device 200, as described herein.

In some embodiments, the memory 230 may store WPTPC coefficients 232 utilized by the write pole tip protrusion compensation mechanism 228 to adjust the amount of power applied to the head heater 310 in order to achieve optimal flying height of the read/write head and prevent touchdowns. The WPTPC coefficients 232 may be determined for the read/write head(s) of the storage device 200 during the CERT process, for example. According to some embodiments, if the storage device 200 includes multiple read/write heads 204, the WPTPC coefficients 232 may include coefficients determined and stored independently for each head. In other embodiments, the WPTPC coefficients 232 may be stored in some other computer-readable storage media in or accessible to the controller 220, including in the M/C of the disk 202.

In addition to the memory 230, the environment may include other computer-readable media storing program modules, data structures and other data described herein for performing adaptive write pole tip protrusion compensation in the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a WPTPC coefficient calculation module 240. The WPTPC coefficient calculation module 240 may perform methods and processes described herein for determining WPTPC coefficients 232 for the read/write head(s) of the storage device 200. According to some embodiments, the WPTPC coefficient calculation module 240 may be implemented in the controller 220 as software, hardware or any combination of the two. For example, the WPTPC coefficient calculation module 240 may be stored in the memory 230 as part of the firmware of the storage device 200 and may be executed by the processor 222 for performing the methods and processes described herein. The WPTPC coefficient calculation module 240 may alternatively or additionally be stored in other computer-readable media accessible by the controller 220.

In further embodiments, the WPTPC coefficient calculation module 240 may be implemented in a computing system external to and operably connected to the storage device 200 such as to perform the determination of the WPTPC coefficients as described herein as part of a testing of the storage device 200 or components by the manufacturer, for example. The WPTPC coefficient calculation module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, host interface 224, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
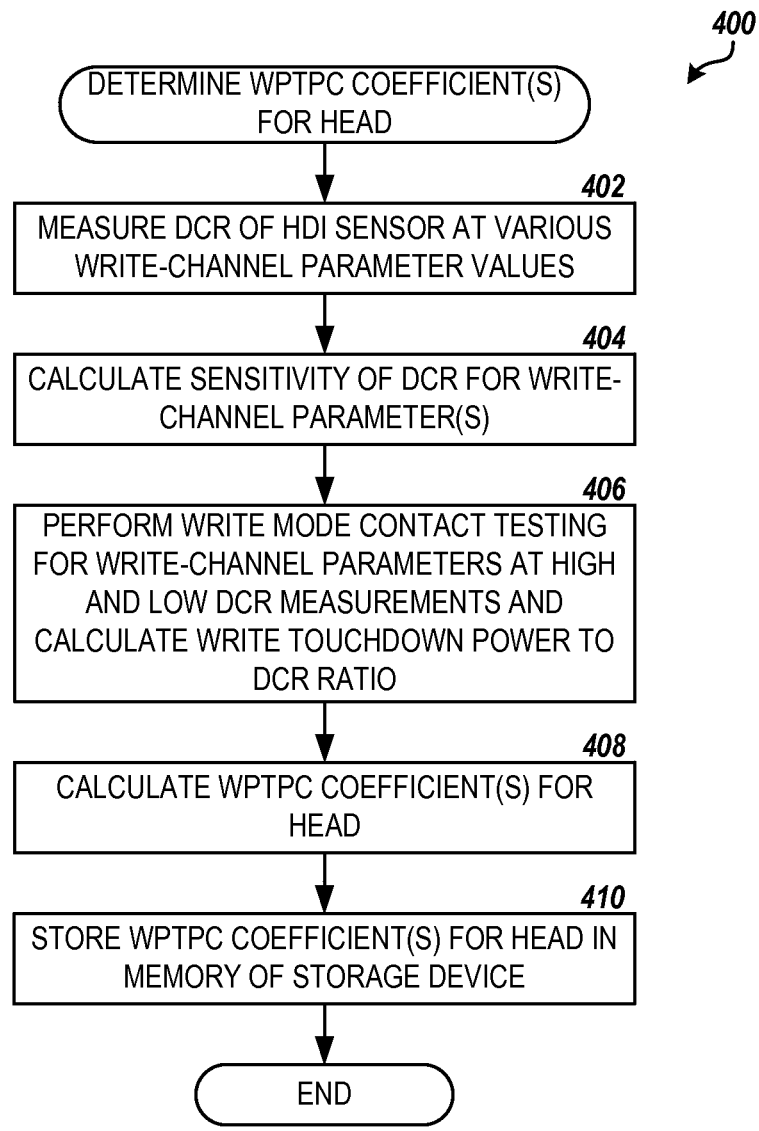
FIG. 4 is a flow diagram showing another routine for determining write pole tip protrusion compensation coefficients for a head of a storage device, according to further embodiments described herein.

FIG. 4 illustrates one routine 400 for determining WPTPC coefficients 232 for a read/write head 204 of a storage device 200, according to some embodiments. The routine 400 may be utilized during the CERT process of the storage device 200 by the device manufacturer, for example. In some embodiments, the routine 400 may be performed by the WPTPC coefficient calculation module 240 described above in regard to FIG. 2. In further embodiments, the routine 400 may be performed by the controller 220 of the storage device 200, by external processors or computing systems performing the CERT process or by some other combination of modules, processors and devices.

The routine 400 begins at step 402, where the WPTPC coefficient calculation module 240 measures the DC resistance ("DCR") of the HDI sensor 314 for various combinations of write-channel parameter values to estimate the relative temperature of the read/write head 204 while writing with these parameter values. According to embodiments, these measurements are obtained with the head heater 310 at a fixed power level ("FODW"). For example, the DCR measurements may be made for N combinations of the write-channel parameter values I, A and D and the results recorded as:

$$M = \begin{bmatrix} I_1 & A_1 & D_1 & 1 \\ I_2 & A_2 & D_2 & 1 \\ \ldots & \ldots & \ldots & \ldots \\ I_N & A_N & D_N & 1 \end{bmatrix}, \text{ result} = \begin{bmatrix} DCR_1 \\ DCR_2 \\ \ldots \\ DCR_N \end{bmatrix}$$

where M is a matrix containing the N combinations of write-channel parameter values and result is a matrix containing the measured DCR of the HDI sensor 314 for each combination of parameter values.

From step 402, the routine 400 proceeds to step 404, where the WPTPC coefficient calculation module 240 calculates the sensitivity of the DCR of the HDI sensor 314, representing the relative temperature of the read/write head 204, to each of the write-channel parameters based on the results of the measurements obtained in step 402. According to some embodiments, the WPTPC coefficient calculation module 240 may calculate the sensitivity ratios dDCR/dI, dDCR/dA and dDCR/dD corresponding to the write-channel parameters I, A and D. For example, linear regression analysis with a least squares approach may be utilized to compute the sensitivity ratios from the parameter matrix M and the results matrix result:

$$\begin{bmatrix} x \\ y \\ z \\ k \end{bmatrix} = (M^T \times M)^{-1} \times M^T \times \text{result}$$

$dDCR/dI=x$; $dDCR/dA=y$; $dDCR/dD=z$; $k=0$

According to further embodiments, the DCR measurements may be performed for the read/write head 204 in several representative zones of the recording media. For example, DCR measurements may be made for the various combinations of write-channel parameter at the end of zones 1, 12, and 48 of 48 target zones. Linear regression may then be utilized to compute sensitivity ratios dDCR/dI, dDCR/dA and dDCR/dD for each zone of the recording media. In this way, separate WPTPC coefficients may be computed for each zone.

The routine 400 proceeds from step 404 to step 406, where the where the WPTPC coefficient calculation module 240 performs write mode contact detection testing of the read/write head 204 for a limited number of write-channel parameter value combinations to correlate the change in the amount of WPTP to the change in the relative temperature of the head. According to some embodiments, the WPTPC coefficient calculation module 240 may perform write mode contact detection testing at the write-channel parameter values corresponding to the high and low DCR measurements in step 402. From this testing, the values $WTD_{HIGH}$ and $WTD_{LOW}$ may be determined representing the power of the head heater 310 at which touchdown of the read/write head 204 was detected at the write-channel parameter values corresponding to $DCR_{HIGH}$ and $DCR_{LOW}$, respectively.

From the measured $WTD_{HIGH}$, $WTD_{LOW}$, $DCR_{HIGH}$ and $DCR_{LOW}$ values the WPTPC coefficient calculation module 240 may then calculate the ratio dWTD/dDCR representing the correlation between the change in WPTP and the change in the relative temperature of the read/write head 204. In some embodiments, the calculation of the ratio dWTD/dDCR may be performed by assuming a linear relationship between the DCR values, representing relative temperatures of the read/write head 204, and the WTD values, representing powers of the head heater 310 at touchdown of the head. While the relationship may not be exactly linear, any error introduced by assuming a linear relationship will be negligible.

From step 406, the routine 400 proceeds to step 408, where the WPTPC coefficient calculation module 240 calculates the WPTPC coefficients 232 for the read/write head 204. For example, to calculate the coefficients a, b, c, and d for the first order WPTP compensation equation described above, the WPTPC coefficient calculation module 240 may utilize the sensitivity ratios dDCR/dI, dDCR/dA and dDCR/dD computed in step 404 and the ratio dWTD/dDCR computed in step 406, as shown below:

a=dWTD/dI=dWTD/dDCR*dDCR/dI
b=dWTD/dA=dWTD/dDCR*dDCR/dA
c=dWTD/dD=dWTD/dDCR*dDCR/dD
d=constant (no meaning in delta calculation)

The routine 400 proceeds from step 408 to step 410, where the WPTPC coefficient calculation module 240 stores the calculated WPTPC coefficients 232 for the read/write head 204 for use by the write pole tip protrusion compensation mechanism 228 described above in regard to FIG. 2. For example, the WPTPC coefficient calculation module 240 may store the WPTPC coefficients 232 for the read/write head 204 in the memory 230 of the controller 220 of the storage device 200. In some embodiments, a set of WPTPC coefficients 232 may be determined and stored for each read/write head 204 in each target zone of the recording media of the storage device 200. For example, the sets of WPTPC coefficients 232 may be stored in the memory 230 in a form shown below in TABLE 1:

TABLE 1

Storage of WPTPC Coefficients

| Head | Zone | WPTPC Coefficients |
|---|---|---|
| $HD_0$ | 1 | a = −0.58, b = −0.33, c = −0.23 |
| $HD_0$ | 2 | a = −0.57, b = −0.30, c = −0.21 |
| ... | ... | ... |
| $HD_0$ | 48 | a = −0.40, b = −0.20, c = −0.10 |
| $HD_1$ | 1 | a = −0.61, b = −0.29, c = −0.19 |
| ... | ... | ... |
| $HD_N$ | 48 | a = −0.59, b = −0.33, c = −0.27 |

It will be appreciated by one skilled in the art that the tabular data shown in TABLE 1 is provided for illustrative purposes only, and that the table may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice, and may depend on the technology, performance and other requirements of the processor 222, controller 220 or other elements of the storage device 200 in which the data structures are implemented. It will be further appreciated that the entries in the WPTPC coefficients 232 stored in the memory 230 may contain additional data elements beyond those shown in the table and described herein. From step 410, the routine 400 ends.

Based on the foregoing, it will be appreciated that technologies for adaptive write pole tip protrusion compensation in a storage device having magnetic recording media are presented herein. While embodiments are described herein in regard to an HDD device, it will be appreciated that the embodiments described in this disclosure may be utilized in any storage device containing magnetic media and a read/write head containing an inductive writing element, including but not limited to, a magnetic disk drive, a hybrid magnetic and solid state drive, a magnetic tape drive and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    performing a plurality of writes of a head of a storage device, each of the writes having a different value for at least one write-channel parameter;
    measuring a variation in a head temperature of the head for each of the writes;
    determining a sensitivity of the head temperature to change in the value of the write-channel parameter based on the writes;
    determining a ratio of change in write pole tip protrusion of the head to change in head temperature; and
    calculating a first coefficient corresponding to the write-channel parameter based on the sensitivity of the head temperature to change in the value of the write-channel parameter and the ratio of change in write pole tip protrusion of the head to change in head temperature, the first coefficient utilized to compensate for write pole tip protrusion compensation based at least in part on the value of the write-channel parameter.

2. The method of claim 1, wherein the first coefficient is further utilized to determine a power level for a head heater based at least in part on the value of the write-channel parameter to compensate for write pole tip protrusion.

3. The method of claim 1, wherein measuring the variation in the head temperature comprises measuring a resistance of a head disk interface ("HDI") sensor in the head.

4. The method of claim 1, further comprising storing the first coefficient in a controller of the storage device, the stored first coefficient associated with the head.

5. The method of claim 1, wherein determining the sensitivity of the head temperature to change in the value of the write-channel parameter comprises performing linear regression analysis on values of the write-channel parameter and measurements of variation in the head temperature recorded from the writes.

6. The method of claim 1, wherein determining the ratio of change in write pole tip protrusion of the head to change in head temperature comprises performing write mode contact detection testing of the head for values of the write-channel parameter corresponding to a high temperature measurement of the head and a low temperature measurement of the head from the writes.

7. The method of claim 1, wherein the at least one write-channel parameter comprises one of a write current, a write overshoot amplitude, or a write overshoot duration.

8. The method of claim 1, further comprising calculating a plurality of coefficients corresponding to multiple write-channel parameters to be utilized to compensate for write pole tip protrusion.

9. The method of claim 1, where measuring the variation in the head temperature of the head for each of the writes further comprises:
    determining the sensitivity of the head temperature to the change in the value of the write-channel parameter in each of a plurality of target zones on a recording media of the storage device; and
    calculating the first coefficient corresponding to the write-channel parameter for each of the target zones.

10. The method of claim 1, wherein the method is performed during a burn-in processing of the storage device.

11. A non-transitory computer-readable storage medium having processor-executable instructions stored thereon that, when executed by a processor, cause the processor to:
    perform a plurality of test writes of a head of a storage device, each test write having a different value for a write-channel parameter;
    measure a resistance of a head disk interface ("HDI") sensor of the head for each test write;
    determine a resistance sensitivity of the HDI sensor to change in the value of the write-channel parameter based on the test writes;
    determine a ratio of change in write pole tip protrusion of the head to change in resistance of the HDI sensor; and
    calculate a coefficient corresponding to the write-channel parameter based on the resistance sensitivity of the HDI sensor to change in the value of the write-channel parameter and the ratio of change in write pole tip protrusion of the head to change in resistance of the HDI sensor.

12. The computer-readable storage medium of claim 11, wherein determining the sensitivity of the resistance of the HDI sensor to change in the value of the write-channel parameter comprises performing linear regression analysis on values of the write-channel parameter and measurements of the resistance of the HDI sensor recorded from the plurality of test writes.

13. The computer-readable storage medium of claim 11, wherein determining the ratio of change in write pole tip protrusion of the head to change in resistance of the HDI sensor comprises performing write mode contact detection testing of the head for values of write-channel parameter corresponding to a high temperature measurement of the head and a low temperature measurement of the head from the plurality of test writes.

14. The computer-readable storage medium of claim 11, wherein the write-channel parameter comprises one of a write current, a write overshoot amplitude, or a write overshoot duration.

15. The computer-readable storage medium of claim 11, having further processor-executable instructions stored thereon that cause the processor to calculate a plurality of coefficients corresponding to multiple write-channel parameters to be utilized by a write pole tip protrusion compensation mechanism of the storage device.

16. The computer-readable storage medium of claim 15, wherein the plurality of coefficients are calculated during a burn-in processing of the storage device.

17. A system comprising:
a storage device comprising a read/write head;
a processor operably connected to the storage device; and
a write pole tip protrusion compensation ("WPTPC") coefficient calculation module operably connected to the processor and configured to cause the processor to perform the steps of
perform a plurality of test writes of the read/write head, each of the test writes having a different combination of values for a plurality of write-channel parameters,
measure a variation in a head temperature of the read/write head for each of the test writes,
determine a sensitivity of the head temperature to change in the value of each of the write-channel parameters based on the test writes,
determine a ratio of change in write pole tip protrusion of the read/write head to change in head temperature,
calculate a WPTPC coefficient corresponding to each of the write-channel parameters based on the sensitivity of the head temperature to change in the value of the write-channel parameter and the ratio of change in write pole tip protrusion of the head to change in head temperature, and
store the WPTPC coefficient corresponding to each of the write-channel parameters in a memory of the storage device.

18. The system of claim 17, wherein measuring the variation in the head temperature comprises measuring a resistance of a head disk interface ("HDI") sensor in the read/write head.

19. The system of claim 17, wherein determining the sensitivity of the head temperature to change in the value of each of the write-channel parameters comprises performing linear regression analysis on the combinations of values for the write-channel parameters and measurements of the head temperature recorded from the test writes.

20. The system of claim 17, wherein the plurality of write-channel parameters comprises a write current, a write overshoot amplitude, and a write overshoot duration.

* * * * *